(12) United States Patent
Nepveaux et al.

(10) Patent No.: US 12,437,408 B2
(45) Date of Patent: Oct. 7, 2025

(54) SYSTEM AND METHOD OF FEATURE DETECTION FOR AIRBORNE BATHYMETRY

(71) Applicant: FNV IP B.V., Leidschendam (NL)

(72) Inventors: Marcus Nepveaux, Lafayette, LA (US); Jed Abanat, Houston, TX (US); Anmol Sharan Nagi, Delta (CA)

(73) Assignee: FNV IP B.V., Leidschendam (NL)

( * ) Notice: Subject to any disclaimer, the term of this patent is extended or adjusted under 35 U.S.C. 154(b) by 395 days.

(21) Appl. No.: 18/076,190

(22) Filed: Dec. 6, 2022

(65) Prior Publication Data

US 2024/0185423 A1 Jun. 6, 2024

(51) Int. Cl.
*G06T 7/10* (2017.01)

(52) U.S. Cl.
CPC ...... *G06T 7/10* (2017.01); *G06T 2207/20084* (2013.01); *G06T 2207/30181* (2013.01)

(58) Field of Classification Search
CPC ............. G06T 7/10; G06T 2207/20084; G06T 2207/30181; G06T 7/11; G06T 2207/10028; G06V 10/454; G06V 10/764; G06V 10/82; G06V 20/194; G06V 20/64; G01S 17/89
See application file for complete search history.

(56) References Cited

U.S. PATENT DOCUMENTS

| | | | | |
|---|---|---|---|---|
| 2019/0251398 | A1* | 8/2019 | Godwin, IV | G06F 18/217 |
| 2021/0374461 | A1* | 12/2021 | Park | G06T 7/194 |
| 2022/0172464 | A1* | 6/2022 | Ross | G05D 1/0044 |
| 2022/0351523 | A1* | 11/2022 | Kim | G06V 10/82 |
| 2022/0392211 | A1* | 12/2022 | Johnson | G06V 10/26 |

FOREIGN PATENT DOCUMENTS

| | | | | |
|---|---|---|---|---|
| CN | 111027446 | A | * | 4/2020 |
| CN | 113327297 | A | * | 8/2021 ........... G06F 18/214 |

OTHER PUBLICATIONS

Ji et al., "Full-Waveform Classification and Segmentation-Based Signal Detection of Single-Wavelength Bathymetric LiDAR," in IEEE Transactions on Geoscience and Remote Sensing, vol. 60, pp. 1-14, 2022, Art No. 4208714, doi: 10.1109/TGRS.2022.3198168. (Year: 2022).*

Zorzi et al., "Full-Waveform Airborne LiDAR Data Classification Using Convolutional Neural Networks," in IEEE Transactions on Geoscience and Remote Sensing, vol. 57, No. 10, pp. 8255-8261, Oct. 2019, doi: 10.1109/TGRS.2019.2919472. (Year: 2019).*

(Continued)

*Primary Examiner* — Emily C Terrell
*Assistant Examiner* — Julia Z. Yao
(74) *Attorney, Agent, or Firm* — Polsinelli PC

(57) ABSTRACT

The present disclosure is directed to systems and techniques for processing frames of data. For example, a method can include obtaining a plurality of geospatial data inputs, each geospatial data input of the plurality of geospatial data inputs associated with a sample time and a surveyed area; generating a plurality of features corresponding to each geospatial data input of the plurality of geospatial data inputs; and generating, using a segmentation machine learning network, one or more segmentation masks for the plurality of geospatial data inputs.

20 Claims, 7 Drawing Sheets

(56) References Cited

OTHER PUBLICATIONS

Chandhok. "U-Net: Training Image Segmentation Models in PyTorch," pyimagesearch [retrieved Nov. 8, 2021]. Retrieved from Internet <URL: https://pyimagesearch.com/2021/11/08/u-net-training-image-segmentation-models-in-pytorch/> (Year: 2021).*

Pan et al., "Using Airborne LiDAR Bathymetry-Aided Transfer Learning Method in Riverine Land Cover Classification," 2022, inproceedings 14th International Symposium on Ecohydraulics (2022, Nanjing) conference. URL: https://researchmap.jp/Shijun_Pan/presentations/40612726/attachment_file.pdf (Year: 2022).*

Mader et al. Potential of a Non-linear Full-Waveform Stacking Technique in Airborne LiDAR Bathymetry. PFG 89, 139-158 (2021). https://doi.org/10.1007/s41064-021-00147-y (Year: 2021).*

Zhong et al., "Nearshore Bathymetry from ICESat-2 LiDAR and Sentinel-2 Imagery Datasets Using Deep Learning Approach", 2022, Remote Sensing 14, No. 17: 4229. doi: https://doi.org/10.3390/rs14174229. (Year: 2022).*

Daniel et al., "Investigating Fully Convolutional Network to Semantic Labelling of Bathymetric Point Cloud," 2020, ISPRS Annals of Photogrammetry, Remote Sensing and Spatial Information Sciences, vol. V-2-2020, pp. 657-663. doi: 10.5194/isprs-annals-V-2-2020-657-2020. (Year: 2020).*

Mandlburger et al. "BathyNet: A Deep Neural Network for Water Depth Mapping from Multispectral Aerial Images." PFG 89, 71-89 (2021). https://doi.org/10.1007/s41064-021-00142-3 (Year: 2021).*

* cited by examiner

SYSTEM AND METHOD OF FEATURE DETECTION FOR AIRBORNE BATHYMETRY

TECHNICAL FIELD

The present disclosure generally relates to automated and/or semi-automated mapping and rendering of map data. For example, aspects of the present disclosure are related to systems and techniques of generating bathymetric point clouds based on performing segmentation using a machine learning system.

BACKGROUND

Geospatial images, representing a portion of the earth's surface, may be used to identify features of interest. Features of interest can include, but are not limited to, commercially exploitable features or geohazards. Geospatial images (e.g., also referred to as geospatial mapping data or geospatial data) can include bathymetry data associated with the measurement of the depth of water and/or other features of interest in oceans, seas, or lakes, among various other bodies of water. For example, bathymetry data can be used to determine underwater topography associated with subsea regions, coastal regions, near-shore regions, etc.

In some cases, the effective identification and mapping of underwater topography (e.g., subsea geohazards) can be critical to safe and economically efficient subsea operations, including oil and gas operations. Subsea geospatial images (including bathymetry data) may be collected in many different forms, including, for example, multibeam echosounder (MBES) bathymetry data, datasets from spectral sensors, satellite imagery data, airborne light detection and ranging (LIDAR) bathymetry (ALB) data, optical images from autonomous or remote-operated vehicles, etc. While large amounts of subsea geospatial data can be generated using various surveying techniques, the identification and mapping of features of interest is a critical and often rate-limiting step in data image processing and analysis. Accordingly, there is a need for improved techniques for analyzing and processing geospatial data.

Machine learning is capable of analyzing tremendously large datasets at a scale that continues to increase. Using various machine learning techniques and frameworks, it is possible to analyze datasets to extract patterns and correlations that may otherwise have never been noticed when subject to human analysis alone. Using carefully tailored data inputs a machine learning system can be manipulated to learn a desired operation, function, or pattern. However, this training process can be complicated by the fact that the machine learning system's inner functionality remains largely opaque to the human observer and analytical results from machine learning techniques may be highly input or method dependent. For instance, training datasets can easily be insufficient, biased or too small resulting in faulty or otherwise insufficient training. As a result, there is a need to provide effective automated mapping utilizing machine learning.

BRIEF SUMMARY

In some examples, systems and techniques are described for performing segmentation of one or more frames of bathymetry data using a machine learning network. For example, a machine learning network can generate one or more feature detection outputs based on performing semantic segmentation of one or more input bathymetry waveforms.

According to at least one illustrative example, a method is provided for processing geospatial data, the method including: obtaining a plurality of geospatial data inputs, each geospatial data input of the plurality of geospatial data inputs associated with a sample time and a surveyed area; generating a plurality of features corresponding to each geospatial data input of the plurality of geospatial data inputs; and generating, using a segmentation machine learning network, one or more segmentation masks for the plurality of geospatial data inputs.

In another example, an apparatus for processing geospatial data is provided that includes a memory (e.g., configured to store data, such as virtual content data, one or more images, etc.) and one or more processors (e.g., implemented in circuitry) coupled to the memory. The one or more processors are configured to and can: obtain a plurality of geospatial data inputs, each geospatial data input of the plurality of geospatial data inputs associated with a sample time and a surveyed area; generate a plurality of features corresponding to each geospatial data input of the plurality of geospatial data inputs; and generate, using a segmentation machine learning network, one or more segmentation masks for the plurality of geospatial data inputs.

In another example, a non-transitory computer-readable medium is provided that has stored thereon instructions that, when executed by one or more processors, cause the one or more processors to: obtain a plurality of geospatial data inputs, each geospatial data input of the plurality of geospatial data inputs associated with a sample time and a surveyed area; generate a plurality of features corresponding to each geospatial data input of the plurality of geospatial data inputs; and generate, using a segmentation machine learning network, one or more segmentation masks for the plurality of geospatial data inputs.

In another example, an apparatus is provided, the apparatus including: means for obtaining a plurality of geospatial data inputs, each geospatial data input of the plurality of geospatial data inputs associated with a sample time and a surveyed area; means for generating a plurality of features corresponding to each geospatial data input of the plurality of geospatial data inputs; and means for generating, using a segmentation machine learning network, one or more segmentation masks for the plurality of geospatial data inputs.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are therefore not to be considered to be limiting of its scope, the principles herein are described and explained with additional specificity and detail through the use of the accompanying drawings in which.

DETAILED DESCRIPTION

Figure 1:
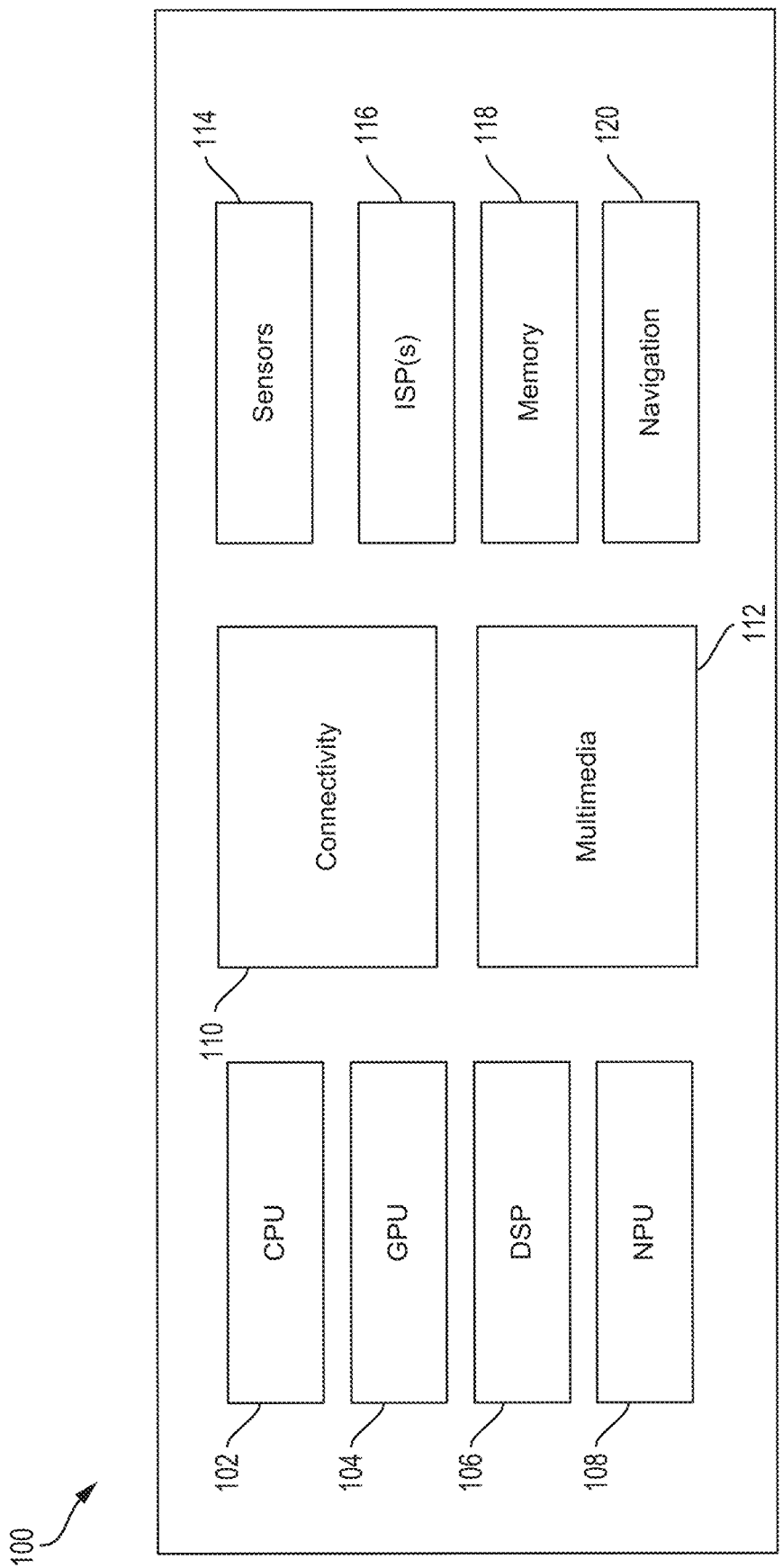
FIG. 1 illustrates an example implementation of a system-on-a-chip (SoC), in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Image semantic segmentation is a task of generating segmentation results for a frame of image data. For example, semantic segmentation can be performed for a frame of image data such as a still image or photograph. In some aspects, semantic segmentation can be performed for a frame of geospatial data, or other types of data that can be represented in a visual form. For example, semantic segmentation can be performed for frames of geospatial data comprising bathymetry waveforms, as will be described in greater depth below.

Segmentation results can include one or more segmentation masks generated to indicate one or more locations, areas, and/or pixels within a frame of image data that belong to a given semantic segment (e.g., a particular object or feature, class of objects or features, etc.). For example, each pixel of a segmentation mask can include a value indicating a particular semantic segment (e.g., a particular object/feature, class of objects/feature, etc.) to which each pixel belongs. In some examples, the value associated with each pixel of a segmentation mask can be a probability of the pixel belonging to a given semantic segment.

In some examples, features can be extracted from an image frame and used to generate one or more segmentation masks for the image frame based on the extracted features. In some cases, machine learning can be used to generate segmentation masks based on the extracted features. For example, a convolutional neural network (CNN) can be trained to perform semantic image segmentation by inputting into the CNN many training images and providing a known output (or label) for each training image. The known output for each training image can include one or more ground-truth segmentation masks corresponding to a given training image.

In some cases, image segmentation can be performed to segment image frames into segmentation masks based on an object classification scheme (e.g., the pixels of a given semantic segment all belong to the same classification or class). For example, one or more pixels of an image frame can be segmented into classifications such as human, hair, skin, clothes, house, bicycle, bird, background, etc. In one illustrative example, when semantic segmentation is performed for an input comprising one or more frames of geospatial data (e.g., bathymetry data), a given input frame can be segmented into segmentation masks based on a feature detection scheme that corresponds to different types of surfaces represented in the bathymetry data. For example, an input bathymetry waveform can be segmented into a water surface mask, a seabed mask, a topographic feature mask, etc.

In some examples, a segmentation mask can include a first value for pixels that belong to a first classification, a second value for pixels that belong to a second classification, etc. In other examples, separate segmentation masks can be generated for the different classifications. In some examples, a segmentation mask can additionally, or alternatively, include one or more classifications for a given pixel. For example, instance segmentation can be performed to further classify (e.g., segment) pixels that are identified as belonging to one of the semantic classifications. For instance, pixels identified as belonging to a water surface classification can be further segmented, using instance segmentation, into sub-classifications associated with the water surface classification. Sub-classifications associated with the water surface classification can include, but are not limited to, buoys, vessels, platforms, etc. Pixels identified as belonging to a "buoy" or other sub-classification can be included in a semantic segment (e.g., mask) associated with the "buoy" sub-classification and can also be included in a different semantic segment (e.g., mask) associated with the larger, "water surface" classification.

Segmentation masks can be used to apply one or more processing operations to a frame of input data (e.g., such as image data, geospatial data, bathymetry waveforms, etc.). For example, high-resolution mapping data, such as point cloud-based mapping data, can be generated by segmenting one or more bathymetry waveforms into one or more segmentation masks that separate the various features represented in the bathymetry waveform (e.g., water surface features, seabed features, topographic features, etc.).

The accuracy and quality of subsequent processing operations that use semantic segmentation masks can often depend on the underlying accuracy and quality of the semantic segmentation mask. For example, if a segmentation mask does not accurately identify the pixels in an input frame or image that represent a given feature, subsequent feature-specific processing operations that are performed based on the inaccurate segmentation mask can yield low quality or noisy results. In other words, an inaccurate segmentation mask corresponding to a given feature or classification may either be overinclusive or underinclusive relative to the actual or ground-truth pixels that represent the given feature in the input data frame. For example, an overinclusive segmentation mask may be inaccurate based on including additional pixels that do not belong to the given feature/classification. Similarly, an underinclusive segmentation mask may be inaccurate based on including only a portion of the pixels of the input data frame that correctly belong to the given feature/classification, while incorrectly omitting others.

Various aspects of the present disclosure will be described below with respect to the figures.

FIG. 1 illustrates an example implementation of a system-on-a-chip (SOC) 100, which may include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU 102, DSP 106, and/or GPU 104. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the CPU 102 may comprise code to search for a stored multiplication result in a lookup table (LUT) corresponding to a multiplication product of an input value and a filter weight. The instructions loaded into the CPU 102 may also comprise code to disable a multiplier during a multiplication operation of the multiplication product when a lookup table hit of the multiplication product is detected. In addition, the instructions loaded into the CPU 102 may comprise code to store a computed multiplication product of the input value and the filter weight when a lookup table miss of the multiplication product is detected.

SOC 100 and/or components thereof may be configured to perform image processing using machine learning techniques according to aspects of the present disclosure discussed herein. For example, SOC 100 and/or components thereof may be configured to perform semantic image segmentation according to aspects of the present disclosure. In some cases, by using neural network architectures such as transformers and/or shifted window transformers in determining one or more segmentation masks, aspects of the present disclosure can increase the accuracy and efficiency of semantic image segmentation.

In general, ML can be considered a subset of artificial intelligence (AI). ML systems can include algorithms and statistical models that computer systems can use to perform various tasks by relying on patterns and inference, without the use of explicit instructions. One example of a ML system is a neural network (also referred to as an artificial neural network), which may include an interconnected group of artificial neurons (e.g., neuron models). Neural networks may be used for various applications and/or devices, such as image and/or video coding, image analysis and/or computer vision applications, Internet Protocol (IP) cameras, Internet of Things (IoT) devices, autonomous vehicles, service robots, among others.

Individual nodes in a neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation" (sometimes referred to as a feature map or an activation map). The weight values may initially be determined by an iterative flow of training data through the network (e.g., weight values are established during a training phase in which the network learns how to identify particular classes by their typical input data characteristics).

Different types of neural networks exist, such as convolutional neural networks (CNNs), recurrent neural networks (RNNs), generative adversarial networks (GANs), multi-layer perceptron (MLP) neural networks, transformer neural networks, among others. For instance, convolutional neural networks (CNNs) are a type of feed-forward artificial neural network. Convolutional neural networks may include collections of artificial neurons that each have a receptive field (e.g., a spatially localized region of an input space) and that collectively tile an input space. RNNs work on the principle of saving the output of a layer and feeding this output back to the input to help in predicting an outcome of the layer. A GAN is a form of generative neural network that can learn patterns in input data so that the neural network model can generate new synthetic outputs that reasonably could have been from the original dataset. A GAN can include two neural networks that operate together, including a generative neural network that generates a synthesized output and a discriminative neural network that evaluates the output for authenticity. In MLP neural networks, data may be fed into an input layer, and one or more hidden layers provide levels of abstraction to the data. Predictions may then be made on an output layer based on the abstracted data.

Deep learning (DL) is one example of a machine learning technique and can be considered a subset of ML. Many DL approaches are based on a neural network, such as an RNN or a CNN, and utilize multiple layers. The use of multiple layers in deep neural networks can permit progressively higher-level features to be extracted from a given input of raw data. For example, the output of a first layer of artificial neurons becomes an input to a second layer of artificial neurons, the output of a second layer of artificial neurons becomes an input to a third layer of artificial neurons, and so on. Layers that are located between the input and output of the overall deep neural network are often referred to as hidden layers. The hidden layers learn (e.g., are trained) to transform an intermediate input from a preceding layer into a slightly more abstract and composite representation that can be provided to a subsequent layer, until a final or desired representation is obtained as the final output of the deep neural network.

As noted above, a neural network is an example of a machine learning system, and can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low-level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
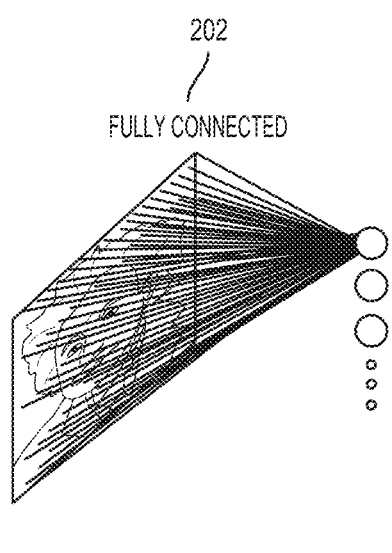
FIG. 2A illustrates an example of a fully connected neural network, in accordance with some examples.
Figure 2B:
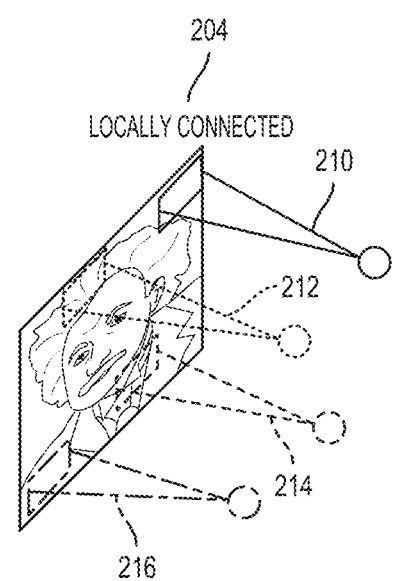
FIG. 2B illustrates an example of a locally connected neural network, in accordance with some examples.

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, as the higher layer neurons in a given region may receive inputs that are tuned through training to the properties of a restricted portion of the total input to the network.

As mentioned previously, the systems and techniques described herein can be used to generate one or more segmentation masks corresponding to features that are identified in or otherwise represented in one or more bathymetry waveforms. In some aspects, the systems and techniques can be used to generate one or more segmentation masks corresponding to features that are identified or otherwise represented in various other forms of structured data, other than bathymetry data. For example, the systems and techniques can generate one or more segmentation masks corresponding to features that are identified or otherwise represented in point cloud images or other image series, any vertical collection of data from a point cloud database or other point cloud data source, a 3D volume of data, including, but not limited to, multibeam information associated with a water column, 3D seismic data, side scan data (e.g., water column profile information combined with imagery of the seabed. The systems and techniques may additionally be utilized to generate one or more segmentation masks corresponding to features that are identified or otherwise represented in various other 2D data sets or 2D data objects, including medical or biolodical data sets (e.g., MRI, XRD, ultrasound, radiography or radiotherapy scans, CT scans, etc.) In one illustrative example, the bathymetry waveforms can be airborne LIDAR bathymetry (ALB) waveforms. Airborne LIDAR (Light Detection and Ranging) bathymetry is an active remote sensing technique that can be used to derive underwater topography based on detecting surface and bottom signals with a scanning laser. Laser pulses can be transmitted to penetrate the water column, and a reflection or return signal can be measured in response.

An ALB system (and/or other laser or LIDAR-based bathymetry system) can be carried by an aircraft that flies over a geographic area that is to be surveyed. For instance, an aircraft that includes an ALB system may fly at a pre-determined altitude above the ocean surface (and/or a pre-determined altitude relative to mean sea level, etc.). The ALB system can include a laser transmitter that is used to transmit a LIDAR swath having a width that is determined based at least in part on the pre-determined altitude flown by the aircraft. The LIDAR swath can include a plurality of individual laser footprints, which may be circular in nature and arranged in a line to form the LIDAR swath, or a single pulse diverged in the cross-track direction to produce a fan beam which forms the swath. The LIDAR swath may additionally be associated with a laser footprint width on the ocean floor. Reflections of the LIDAR swath may be received by an onboard receiver on the aircraft. For example, the onboard receiver and the laser transmitter may be included in the same ALB system.

The waveform(s) of both the outgoing and the returned (e.g., reflected) signals can be stored and used to generate ALB waveform data. In other words, ALB waveform data can include outgoing waveforms, return signal waveforms, and/or various combinations of the two. In some examples, ALB waveforms can be processed and analyzed to determine the topography of shallow coastal or inland waters. ALB waveforms may additionally be used to determine topography information of adjacent areas of land (e.g., land areas adjacent to the coastal or inland waters, etc.).

ALB can be used to obtain high-accuracy and high-resolution nearshore and coastal mapping data. In some examples, ALB improves upon existing airborne bathymetric surveying techniques. For instance, many existing airborne bathymetric surveying techniques are associated with a trade-off between data density and depth penetration. ALB can be used to obtain mapping data with high data density and high depth penetration. In one illustrative example, an ALB system can obtain 25,000 range observations per second (e.g., 25 kHz sample rate) while also achieving a 3-Secchi disk depth penetration (e.g., which is a measure of water transparency or turbidity). In some cases, the resulting high-resolution bathymetry data obtained using an ALB system can be comparable to the bathymetry data obtained using multibeam echosounder systems.

In some examples, an ALB system can be deployed to obtain mapping data on its own. In some aspects, an ALB system can be deployed in combination with one or more additional remote sensing systems, such that various bathymetric, topographic, and/or imagery data collection needs can be met using a single/same airborne mission. For example, an ALB system may be deployed in combination with topographic lidars, hyperspectral cameras, etc. The respective sensor data collected using the additional remote sensing systems may, in some cases, be combined or otherwise integrated with ALB waveform data generated by the ALB system.

Existing approaches to processing bathymetry data (e.g., including ALB waveforms) are often based on performing a one-dimensional (1D) regression, in which a single independent variable is mapped to a single dependent variable. It can be computationally complex to generate mapping data such as point clouds based on applying a 1D regression to ALB waveform data. Additionally, the resulting mapping data may be prone to significant noise artifacts. A noise artifact can be an erroneous detection of a feature in the ALB waveform data (e.g., an erroneous detection of the water surface or other bathymetric feature, at a location where the feature does not exist). Many existing techniques for processing ALB waveform data are applied directly on the ALB waveform itself, as a signal processing operation. For example, existing approaches to processing ALB waveform data are often based on modelling the response curve of the ALB waveform to determine one or more bathymetric measurements (e.g., determined as a 1D regression problem).

The systems and techniques described herein can be used to generate mapping data (e.g., including high resolution points clouds) based on applying a multi-dimensional, machine-learning based regression approach to ALB waveform data. In some aspects, mapping data may also be referred to herein as "surveying data." As will be described in greater depth below, in some embodiments, the systems and techniques can utilize spatio-temporal information associated with ALB waveform data to perform improved feature detection (e.g., improved detection and/or classification of features such as the water surface, seabed, topographic, geological, environmental features etc., that are represented in the ALB waveform(s)). In some cases, the systems and techniques can utilize multiple inputs of spatial information rather than spatio-temporal information (e.g., the temporal dimension can be replaced with multiple different inputs in the spatial dimension). For instance, a spatio-temporal input may comprise spatial information obtained at time t−1, t, and t+1. A spatial information input may comprise three different spatial inputs (e.g., obtained using three different spatial sensors at the same time t). In some embodiments, additional feature detection may be performed to detect or otherwise identify one or more features related to safety and/or navigational hazards. For instance, additional feature detection may be performed to detect or identify features such as shipwrecks, underwater debris, etc. Specific applications related to water systems but also environmental data sets such as seagrass observations/studies and also risk mitigation data sets such as UXO (unexploded ordinances) detection and monitoring of mammals, marine mammals and/or fish populations.

In some embodiments, the systems and techniques described herein can utilize computer vision to identify multiple principal features in the ALB waveform data simultaneously. Rather than modeling ALB waveform response curves or performing other signal processing operations on the ALB waveform directly, the systems and techniques can encode ALB waveform data using a rasterized (e.g., pixel-based) representation of the lidar bathymetry returns from an ALB system. A raw ALB waveform is a time log of the interaction between the lidar laser pulse and its environment (e.g., the environment being surveyed or mapped), with each discrete sample time associated with a corresponding amplitude measurement (e.g., a corresponding intensity of the return signal).

Figure 4:
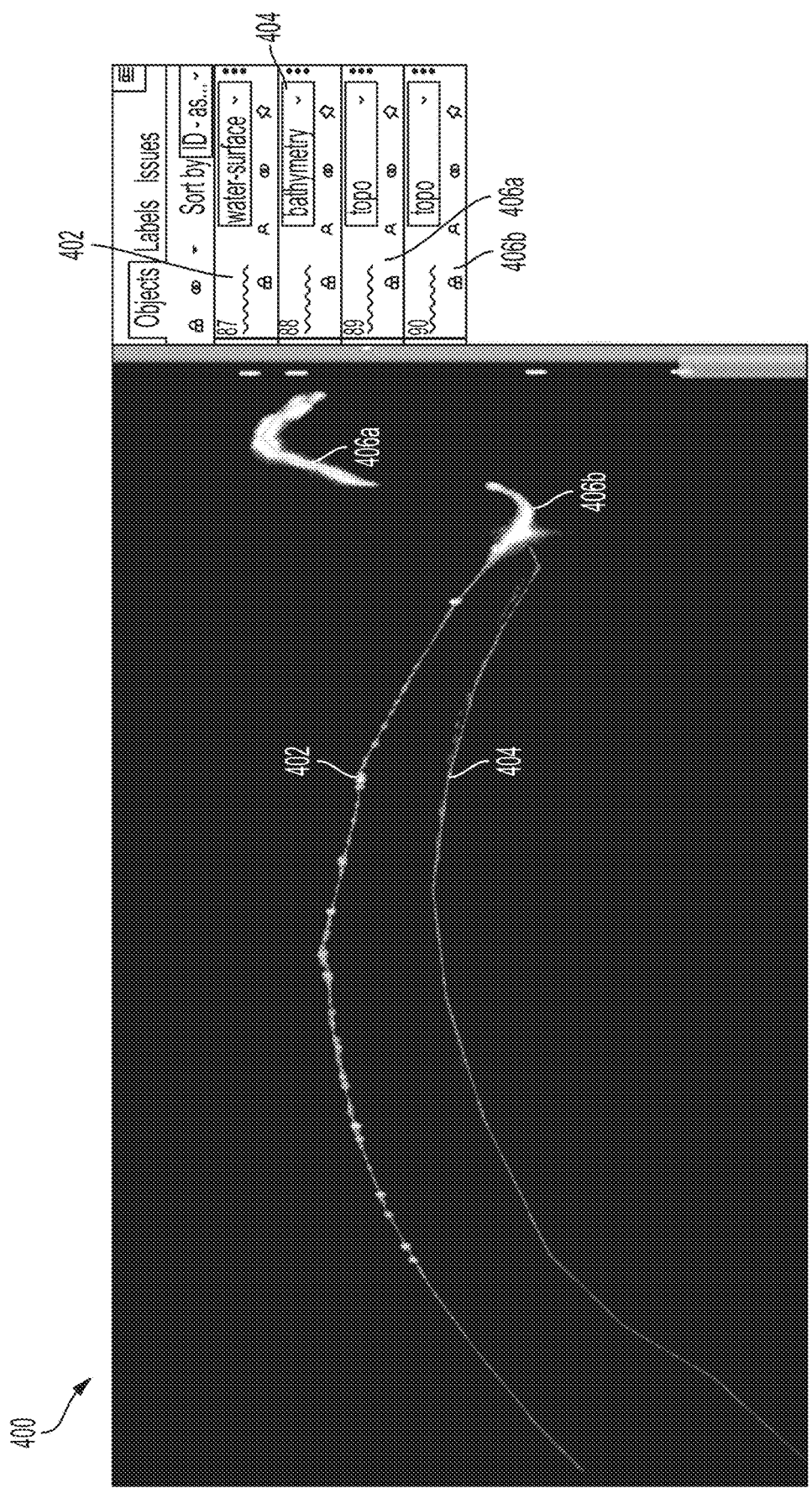
FIG. 4 illustrates an example of an annotated frame of bathymetry data, in accordance with some examples.

By contrast, the presently disclosed rasterized representations of lidar bathymetry returns (e.g., ALB waveforms) can comprise a two-dimensional grid of pixels, with each pixel being associated with an intensity value. For instance, FIG. 4 depicts an example rasterized representation 400 of a lidar bathymetry return, wherein each (x,y) pixel location is associated with a corresponding intensity value. In the grayscale depiction of FIG. 4, a lower intensity value is represented as a darker black color, and a higher intensity value is represented as a lighter black (or white) color.

Figure 3:
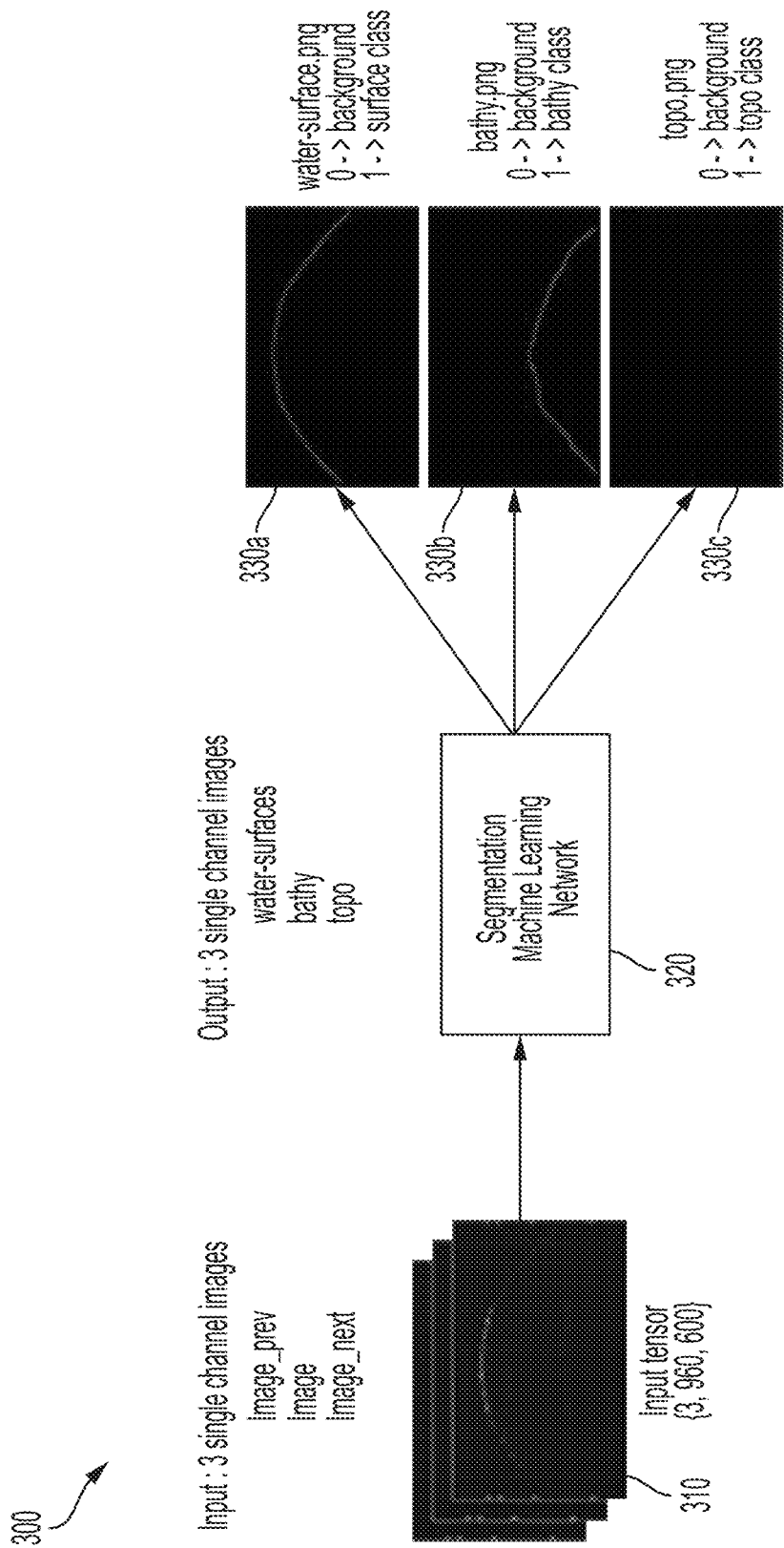
FIG. 3 illustrates an example of a bathymetry waveform segmentation task performed using a segmentation machine learning network, in accordance with some examples.

Based on the presently disclosed rasterized representations of lidar bathymetry returns, multiple principal features can be detected simultaneously for a given ALB waveform or ALB waveform data input. For example, FIG. 3 is a diagram 300 illustrating an example of a bathymetry waveform (e.g., ALB waveform) segmentation task performed using a segmentation machine learning network. As illustrated, a segmentation machine learning network 320 can receive as input one or more rasterized ALB waveform representations 310, perform semantic segmentation (e.g., image segmentation), and generate as output a plurality of segmentation masks 330*a-c* that each correspond to a particular feature or classification within the ALB data.

In some embodiments, the input rasterized ALB waveform representations 310 (e.g., also referred to as rasterized ALB frames) can be obtained as a single, multi-channel tensor. For example, each channel of the multi-channel tensor can represent a different rasterized ALB frame. In one illustrative example, the multi-channel input tensor can be a three-channel tensor, with one channel representing a current rasterized ALB frame/ALB frame of interest, one channel representing an immediately preceding rasterized ALB frame, and one channel representing an immediately subsequent rasterized ALB frame. For example, a three-channel input tensor can include a first channel that represents the rasterized ALB frame for time t−1, a second channel that represents the rasterized ALB frame for time t, and a third channel that represents the rasterized ALB frame for time t+1. In some examples, the t−1, t, and t+1 frames may be separated by a fixed or constant amount of time. For instance, the three frames may be separated by a fixed quantity of milliseconds (ms). In one illustrative example, the three frames may be separated by 33.3 milliseconds (e.g., based on a 30 Hz or 30 fps frame acquisition, where is =1000 ms and 1000 ms/30 frames=33.3 ms frame duration or separation. In other words, the labels "t−1," "t," and "t+1" are not necessarily representative of units of seconds (i.e., the three frames are not necessarily separated by one second each), but instead may be representative of successive frames having various inter-frame separation time intervals.

Each channel of the input 310 can have the same dimensions (e.g., the rasterized ALB frames generated for each time step can have the same dimensions). For instance, as illustrated, the input 310 can comprise a tensor having dimensions of (3, 960, 600), indicating that the input tensor 310 includes three channels (e.g., t−1, t, t+1), each channel representing a rasterized ALB frame having dimensions of 960 pixels×600 pixels. It is noted that these values are provided for purposes of example, and that various other input channel and/or pixel dimensions may also be utilized without departing from the scope of the present disclosure.

The multiple rasterized ALB frames included in the multi-channel tensor input 310 can be spatially and temporally adjacent (e.g., spatio-temporally adjacent). For example, the multiple rasterized ALB frames can be temporally adjacent based on being obtained as consecutive rasterized ALB frames in time (e.g., t−1, t, and t+1 are consecutive in time). When the time step between consecutive rasterized ALB frames is sufficiently small, at least some spatial overlap will additionally be present between a given pair of consecutive rasterized frames. For example, the geographic area that is mapped by the ALB system at time t will include at least a portion of the geographic area that was previously mapped by the ALB system at time t−1 (with the amount of overlap based at least in part on the velocity and trajectory of the aircraft used to collect the ALB data, and the sampling rate associated with generating each rasterized ALB frame). In this manner, the multi-channel input tensor 310 provided to the segmentation machine learning network 320 can be seen to include multiple spatio-temporally adjacent representations of rasterized ALB frames.

The segmentation machine learning network 320 can be implemented using various machine learning models and/or architectures. For example, the segmentation machine learning network 320 can be implemented using one or more neural networks, transformers (e.g., vision transformers), deep learning models, etc. In some examples, the segmentation machine learning network 320 can be implemented using (or otherwise based on) a variety of segmentation models and/or ML architectures can also be utilized (e.g. Lite Reduced Atrous Spatial Pyramid Pooling (LR-ASPP) segmentation model from MobileNetv3). In some embodiments, the segmentation machine learning network 320 can implement an encoder-decoder architecture, in which a plurality of features are generated based on the set of rasterized ALB frames 310 received as input. For example, the rasterized ALB frames 310 can be provided to one or more encoders, which generate as output a plurality of features or embeddings corresponding to the rasterized ALB frames. In other examples, the segmentation machine learning network 320 can implement a segmentation decoder architecture, without including an encoder, in which case the input 310 can include features that were previously generated or determined for the rasterized ALB frames (e.g., input 310 can be obtained as a multi-channel tensor of features generated for the rasterized ALB frames). For example, the segmentation machine learning network 320 can include or otherwise implement a segmentation decoder, such as LR-ASPP.

A segmentation decoder included in or otherwise implemented by the segmentation machine learning network 320 can generate one or more segmentation masks based on receiving as input the plurality of features corresponding to the rasterized ALB frames 310. As mentioned previously, each segmentation mask can be generated to correspond to a given classification (e.g., segment classification) that is determined for the rasterized ALB frames of input 310. For example, when segmentation machine learning network 320 is trained to identify three principal features from an input rasterized ALB frame, the output of segmentation machine learning network 320 can include three different segmentation masks, one for each of the three principal features. In one illustrative example, where the segmentation machine learning network 320 is trained to identify water surface, seabed, and topographic features, the segmentation machine learning network 320 can generate as output a first segmentation mask 330a corresponding to detected water surface features in the input rasterized ALB waveform(s) 310, a second segmentation mask 330b corresponding to detected bathymetric (e.g., seabed) features in the input rasterized ALB waveform(s) 310, and a third segmentation mask 330c corresponding to detected topographic features in the input rasterized ALB waveform(s) 310.

In some aspects, the output 330 of segmentation machine learning network 320 can be a multi-channel tensor, with each channel of the multi-channel tensor comprising a single channel segmentation mask indicative of the detection of a particular feature in the input rasterized ALB waveform(s) 310. As illustrated, when the detected feature are the three principal features water surface, seabed, and topography, the output of segmentation machine learning network 320 can be a three-channel tensor that includes the three segmentation masks 330a, 330b, 330c described above. In some examples, the input tensor 310 and the output tensor 330 can have the same dimensions. For instance, as illustrated in FIG. 3, the input tensor 310 and the output tensor 330 can both be three-channel tensors with each channel having pixel dimensions of 960×600. In some examples, the pixel dimensions of the output channels (e.g., of output tensor 330) can be different than the pixel dimensions of the input channels (e.g., of input tensor 310).

In some cases, the output tensor 330 can include a greater quantity of channels than the input tensor 310. The quantity of channels included in the output tensor 330 can be the same as the quantity of unique features or segmentation classifications that are utilized. For example, if segmentation machine learning network 320 is trained to identify five different features for a given input rasterized ALB frame, the output tensor 330 can be generated as a five-channel tensor (e.g., five channels representing five segmentation masks corresponding to the five detected features/segmentation classifications).

In some embodiments, each output segmentation mask 330a-330c can have the same pixel dimensions as the input rasterized ALB frame(s) 310, as mentioned above. In some aspects, an output segmentation mask can be generated to include a respective probability for each pixel (e.g., each (x,y) pixel location) included in an input rasterized ALB frame. For example, the output segmentation mask can include respective probabilities for each pixel included in the current (e.g., time t) frame of rasterized ALB data. In some aspects, inference can be performed based on an input of three frames (e.g., inference can generate on output tensor 330 that includes three channels or frames, based on receiving the input tensor 310 that also includes three channels or frames). In some cases, inference for a current frame t can be performed based on an input that includes the current frame t and further includes two adjacent frames (e.g., frame t−1 and frame t−2). In some embodiments, inference can be performed by using one or more duplicate frames to pad an input with extra frames such that the input includes a total of three frames. For example, inference can be performed based on obtaining a current frame t and generating two duplicated frames based on current frame t-inference can subsequently be performed on a 3-frame input comprising the current frame t and the two duplicate frames. Similarly, inference can be performed based on obtaining a current frame t and one adjacent frame (e.g., either t−1 or t+1) and duplicating one of the two obtained frames to thereby generate a 3-frame input for inference.

For example, the water surface segmentation mask 330a can include a probability that each pixel or pixel location represents a water surface feature or otherwise belongs to a water surface feature classification; the seabed segmentation mask 330b can include a probability that each of the same pixels or pixel locations represent a seabed feature or otherwise belong to a seabed feature classification; and the topography segmentation mask 330c can include a probability that each of the same pixels of pixel locations represent a topographical feature or otherwise belong to a topographical feature classification. In some aspects, the probability values associated with the respective pixels/pixel locations included in each of the segmentation masks 330a-c can be provided as continuous values (e.g., between 0 and 1, or other desired probability range). In some embodiments, the probability values associated with the respective pixels/pixel locations can be provided as binary probabilities, for example with a given pixel being assigned a probability of either '0' (indicating that the pixel does not belong to the feature class represented by the given segmentation mask) or '1' (indicating that the pixel does belong to the feature class represented by the given segmentation mask).

In some examples, the segmentation machine learning network 320 can generate as output the segmentation masks 330a-c to include continuous probability values or discrete/binary probability values. In some embodiments, the segmentation machine learning network 320 can generate as output the segmentation masks 330a-c to include continuous probability values, and a subsequent or downstream thresholding operation can be applied to convert the continuous probability values to discrete/binary probability values. In one illustrative example, thresholding can be applied such that a pixel in a segmentation mask that has a probability that is less than 75% is assigned a probability value of '0' and pixels with a probability greater than or equal to 75% are assigned a probability value of '1.' Various other thresholding values and/or approaches may also be utilized without departing from the scope of the present disclosure. In some examples, segmentation mask pixels described above as being assigned a probability value of '0' may additionally, or alternatively, be classified as belonging to a background class, wherein the background class is different than the feature class associated with a given segmentation mask (e.g., thereby permitting the easy downstream differentiation between pixels belonging to the feature class of the given segmentation mask and pixels that do not belong/are not of interest).

Further aspects of the presently disclosed segmentation machine learning network will be described below with respect to FIGS. 5 and 6, which depict training and inference architectures, respectively, that can be used to implement the segmentation machine learning network 320 depicted in FIG. 3.

The disclosure turns next to FIG. 4, which is a diagram illustrating an example frame 400 of annotated (e.g., labeled) rasterized ALB waveform data, in accordance with some examples. As mentioned previously, the frame 400 can be seen to depict a rasterized representation of ALB waveform data that includes a two-dimensional grid of pixels each having an intensity value (e.g., intensity of the ALB return signal or waveform). In the grayscale representation seen in FIG. 4, darker shaded pixels represent a lower intensity value with lighter shaded pixels representing a greater intensity value.

Raw or unlabeled rasterized frames of ALB waveform data can be annotated (e.g., labeled) to generate one or more training data sets for training the presently disclosed segmentation machine learning network (e.g., such as the segmentation machine learning network 320 illustrated in FIG. 3). For example, the segmentation machine learning network 320 can be implemented as a supervised machine learning task. In some embodiments, a plurality of annotated frames of rasterized ALB data (e.g., such as the annotated frame 400) can be generated using the Computer Vision Annotation Tool (CVAT), although it is noted that various other systems and techniques for generating annotated frames of rasterized ALB data may also be utilized without departing from the scope of the present disclosure. For instance, the plurality of annotated frames of rasterized ALB data (e.g., such as the annotated frame 400) can also be generated using the VGG Image Annotator (VIA), among various other image annotation tools.

Notably, because the presently disclosed segmentation machine learning network can be used to detect multiple features simultaneously, each of the multiple features for detection can be labeled in each annotated frame of rasterized ALB data. In one illustrative example, each annotated frame of rasterized ALB data (e.g., such as annotated frame 400) can be generated to include one or more labels for each feature/feature classification that is to be learned by the segmentation machine learning network 320. For example, continuing in the example in which the three principal feature classifications are water surface, seabed, and topographic features, the annotated frame of rasterized ALB data 400 can include one or more water surface feature labels 402, one or more seabed feature labels 404, and one or more topographic feature labels (shown here as the topographic feature labels 406a and 406b). A greater number of features or feature classifications for detection can be trained by including, in the annotated frames of rasterized ALB data, a corresponding one or more labels for each additional feature that is to be learned. For instance, the presently disclosed segmentation machine learning network can learn to detect or otherwise identify features such as boats or buoys (e.g., which may be treated as sub-features or sub-classifications of the water surface feature/classification) by generating the annotated frames of rasterized ALB data to include labels for boats or buoys, respectively, when the corresponding return signature for a boat or buoy is present in a given rasterized ALB frame.

The rasterized frames of ALB data that are used to generate a training set of annotated rasterized frames of ALB data can be the same as or similar to the rasterized frames of ALB data that will be used during inference. For example, the training data and inference inputs can both comprise rasterized frames of ALB data that represent a three-dimensional (3D) section of ALB waveform data. These 3D sections of ALB waveform data can allow the presently disclosed segmentation machine learning model to learn a better contextual understanding of the environment associated with the ALB waveform data—compared to existing approaches to processing ALB waveform data, which are based on 1D regression analysis of 1D sections of the lidar waveform, the presently disclosed systems and techniques can generate improved segmentation masks based on at least in part of on leveraging the enhanced spatio-temporal information encoded in the rasterized ALB waveform representations.

In some examples, a 3D section of ALB waveform data can be generated based on combining a plurality of 1D sections into a composite, 2D section. For example, a plurality of discrete lidar waveform signatures can be combined to generate a 2D image of stacked lidar waveform signatures (e.g., the rasterized frame 400 depicted in FIG. 4 can be seen as a 2D image of stacked lidar waveform signatures). A third dimension is introduced by performing the segmentation task as a 3D problem over multiple 2D images of stacked lidar waveform signatures (e.g., a multi-image stack of the 2D images of stacked lidar waveform signatures). For instance, a third dimension can be introduced by providing as input to the segmentation machine learning network 320 the multi-channel input 310, which includes a first 2D image of stacked lidar waveform signatures associated with a subsequent time t−1, a second 2D image of stacked lidar waveform signatures associated with a current time t, and a third 2D image of stacked lidar waveform signatures associated with a subsequent time t+1. In other words, the systems and techniques can perform ALB waveform processing and analysis as a 3D feature detection task implemented over a multi-channel input 310.

Figure 5:
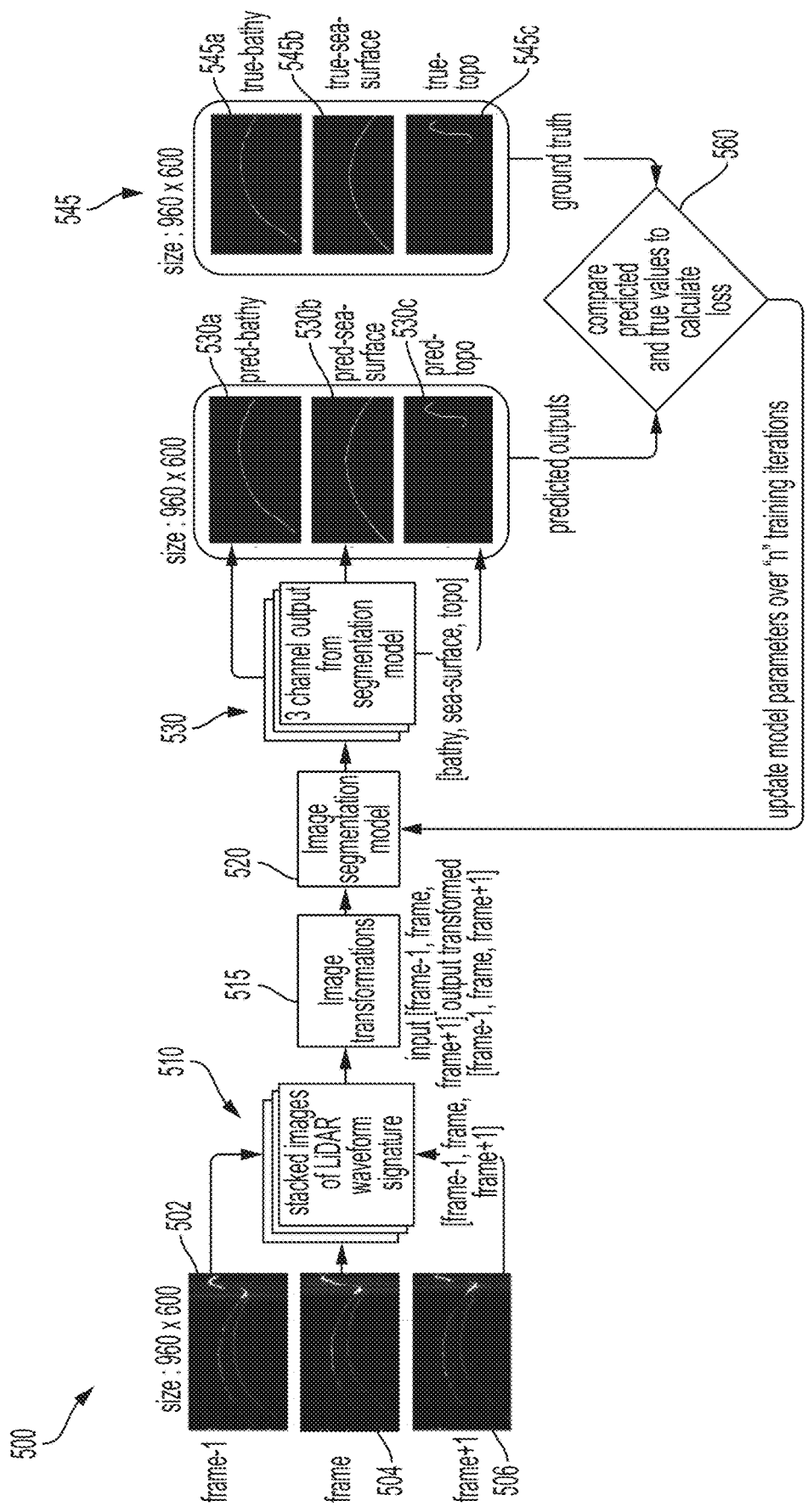
FIG. 5 illustrates an example architecture that can be used to train a bathymetry waveform segmentation machine learning network, in accordance with some examples.

FIG. 5 is a diagram illustrating an example architecture 500 that can be used to train a bathymetry waveform (e.g., ALB waveform) segmentation machine learning network, in accordance with some examples. In some aspects, the example training architecture 500 can include an image segmentation model 520 that is the same as or similar to the segmentation machine learning network 300 illustrated in FIG. 3 and described above.

As illustrated, the example training architecture 500 can receive a training data input 510, comprising a set of stacked images of lidar waveform signatures. In some embodiments, the set of stacked images of lidar waveform signatures can be the same as or similar to that described above, in which multiple 2D rasterized representations of lidar waveform data are obtained for consecutive time instances. In particular, the example of FIG. 5 depicts a training data input 510 that includes a first frame (e.g., previous frame) of rasterized lidar waveform (e.g., ALB waveform) data 502 that is associated with a previous time step t−1, a second frame (e.g., current frame) of rasterized lidar waveform data 504 that is associated with a current time step t, and a third frame (e.g., subsequent frame) of rasterized lidar waveform data 506 that is associated with a next or subsequent time step t+L. In one illustrative example, the multiple frames of rasterized lidar waveform data 502-506 that are included in the training data input 510 can be spatio-temporally overlapping and/or adjacent frames, as also described above.

In some examples, the set of stacked images of lidar waveform signatures 502-506 included in the training data input 510 can be provided to an image transformation engine 515. The image transformation engine 515 can implement one or more image transformation operations, one or more image augmentation operations, one or more pre-processing operations, etc. For example, image transformation engine 515 can, in some embodiments, receive input images 502-506 that are represented as 16-bit image data and convert the 16-bit image data to 32-bit floats. In some embodiments, image transformation engine 515 can perform augmentation and/or transformation operations that can include, but are not limited to, increasing or decreasing the brightness and/or contrast of some (or all) of the respective images included in the training data inputs 510 used during a given training data iteration. In some cases, the augmentation and/or transformation operations can be applied randomly, such as based on a random selection of the lidar waveform training images to which augmentation/transformation will be applied, a random selection of the particular augmentation/transformation operation(s) to apply to the selected lidar waveform training images, a random selection of the directionality and/or magnitude of the augmentation/transformation operation(s) to apply to a selected lidar waveform training image, etc.

In addition to increasing or decreasing brightness, contrast, etc., of various input lidar waveform training images (e.g., such as the input lidar waveform training images 502, 504, 506), the image transformation engine 515 can additionally, or alternatively, flip or mirror input lidar waveform training images in the horizontal direction (e.g., along the horizontal, x-axis); can apply a random shift or crop (e.g., up to 10% of image size) in the horizontal and/or vertical directions; can apply a random rotation (e.g., up to 5 degrees) in the clockwise or counterclockwise directions); etc. Based on applying the one or more augmentation/transformation operations to some (or all) of the respective lidar waveform training images utilized during a given training iteration, the systems and techniques can increase the size of the training data set (e.g., increase the quantity of unique training data points/images), as an augmented or transformed image can provide a separate training data point from the original image provided to the image transformation engine 515. The use of augmented or transformed images generated by the image transformation engine 515 may additionally be seen to improve the resilience of the trained segmentation machine learning network 520 to small variations in the input lidar waveform (e.g., ALB waveform) data, as the image augmentation and transformation operation applied by image transformation engine 515 may be similar to the natural variation that can be observed across various lidar waveform datasets.

In some embodiments, the image transformation engine 515 may additionally apply one or more scaling operations to some (or all) of the input lidar waveform training images (e.g., such as the input lidar waveform training images 502, 504, 506). For example, image transformation engine 515 can apply scaling from 0 to 1 (e.g., min-max normalization, with the max given by the 16-bit value 65535) to some, or all, of the input lidar waveform training images. In some aspects, various image scaling operations can be applied, with the image scaling operation selected based at least in part on an environment in which the image transformation engine 515 is implemented. For example, the image transformation engine 515 can implement a 16-bit image scaling operation, an 8-bit image scaling operation, etc. In some aspects, the image transformation engine 515 can implement image transformation and/or augmentation operations based on a train_transform operation, given by:

```
train_transform = A.Compose(
    [
        A.ToFloat(max_value=65535.0),
        A.RandomBrightnessContrast(
            brightness_limit=0.2, contrast_limit=0.2,
            brightness_by_max=True, p=0.5
        ),
        A.HorizontalFlip(p=0.5),
        A.geometric.transforms.ShiftScaleRotate(
            shift_limit_y=0.1,
            scale_limit=0,
            rotate_limit=5,
            border_mode=BORDER_CONSTANT,
            p=0.5,
        ),
        ToTensorV2( ),
```

In some embodiments, the image transformation engine 515 can apply the same augmentation and/or transformation operations to each input ALB frame included in the plurality of input frames 510 (e.g., the stack of ALB frames 510). In some cases, the image transformation engine 515 can apply different augmentation and/or transformation operations to the respective ALB frames included in the stack/plurality of ALB frames 510.

As illustrated, the original input 510 comprising the annotated and rasterized training ALB frames 502, 504, 506 can be provided as input to the image segmentation model 520. Additionally, or alternatively, a given training iteration can include some (or all) of the augmented training frames generated by the image transformation engine 515. As mentioned previously, the image segmentation model 520 can be the same as or similar to the segmentation machine learning network 320 illustrated in FIG. 3.

In some aspects, each annotated frame of rasterized ALB data (e.g. 502, 504, 506 illustrated in FIG. 5; 400 illustrated in FIG. 4; etc.) can be annotated (e.g., labeled) using one or more polylines. A polyline is a continuous line that includes one or more connected straight line segments, which, together, form a shape. For example, each of the labeled features 402, 404, 406a, 406b can be represented as a polyline that is indicative of the position of the respective feature within the annotated frame of rasterized ALB data 400. Training can be performed by generating a plurality of ground truth segmentation masks (e.g., one for each feature classification represented in a given annotated frame of rasterized ALB data) and determining a difference (e.g., using one or more loss functions) between a segmentation mask output generated by the segmentation machine learning model and the corresponding ground truth segmentation masks.

In particular, during a training iteration, the image segmentation model 520 can generate as output a plurality of segmentation masks 530 (e.g., also referred to as a stack of segmentation masks). As illustrated, the plurality of segmentation masks 530 can include an output segmentation mask generated for each principal feature or classification that the image segmentation model 520 is being trained to detect. For instance, the plurality of segmentation masks 530 can include a first segmentation mask 530a generated corresponding to predicted bathymetry features (e.g., seabed/seafloor) identified in the current input ALB frame 504, a second segmentation mask 530b generated corresponding to predicted sea surface features identified in the current input ALB frame 504, and a third segmentation mask 530c generated corresponding to predicted topography features identified in the current input ALB frame 504.

Recalling that the current input ALB frame 504 is obtained as an annotated frame of ALB training data (e.g., such as the annotated frame 400 illustrated and described above with respect to FIG. 4), the image segmentation model 520 can be trained based on determining a loss 560 between each of the output segmentation masks 530a, 530b, 530c and the corresponding ground-truth (e.g., labeled) segmentation masks 545a, 545b, 545c, respectively. The ground-truth segmentation masks 545 can be obtained in associated with obtaining the input training ALB frame 504 to which the ground-truth segmentation masks 545 correspond.

In some embodiments, the loss 560 can be determined as a cross-entropy loss. In other words, one or more cross-entropy based loss functions can be used to perform training of the image segmentation model 520. In some examples, the loss function 560 can additionally, or alternatively, be implemented based on a dice loss and/or a binary cross-entropy loss (BCE). In one illustrative example, loss function 560 can be implemented as a single/combined loss function that combines a dice loss and a BCE loss function. In some cases, the image segmentation model 520 can be trained based on utilizing one or more error metrics during the training process and/or during various training iterations. For example, the one or more error metrics can include a mean intersection over union (mIOU) error metric, a mean intersection of length error metric, etc.

The image segmentation model 520 can be implemented using a neural network model or architecture, as noted previously. For example, the image segmentation model 520 can utilize a CNN architecture, amongst others. In some embodiments, the image segmentation model 520 can be trained (e.g., as depicted in FIG. 5) without using pre-training. In other words, image segmentation model 520 can be trained according to the approach of FIG. 5, without utilizing a pre-trained model as the initial image segmentation model 520.

In some embodiments, the loss function 560 can compare the ground-truth segmentation masks 545 to the training output segmentation masks 530a as generated directly by the image segmentation model 520. In some aspects, the training output segmentation masks 530a can be thresholded and/or binarized after being output by the image segmentation model 520, i.e., prior to being compared to the corresponding ground-truth segmentation masks 545 to determine the loss 560. For instance, where the ground-truth segmentation masks 545 classify each pixel as either a '0' (e.g., not belonging to the feature classification associated with the given ground-truth segmentation mask) or a '1' (e.g., belonging to the feature classification associated with the given ground-truth segmentation mask), the segmentation masks output by the image segmentation model 520 may first be thresholded and subsequently binarized to a same form as the ground-truth segmentation masks 545 (i.e., suitable for determining the loss between the output and ground-truth masks).

Figure 6:
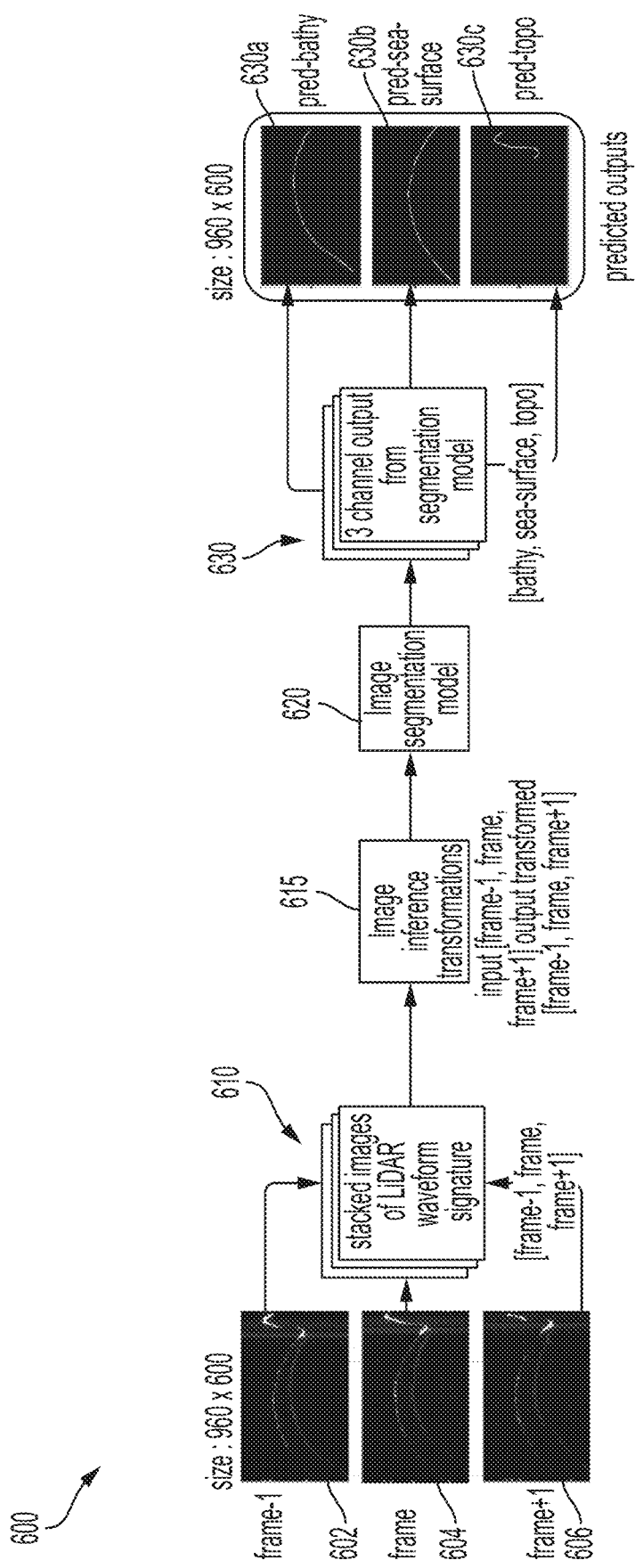
FIG. 6 illustrates an example architecture that can be used to perform inference using a trained bathymetry waveform segmentation machine learning network, in accordance with some examples.

FIG. 6 is a diagram illustrating an example architecture 600 that can be used to perform inference using a trained bathymetry waveform segmentation machine learning network, in accordance with some examples. In one illustrative example, the inference architecture 600 of FIG. 6 can be the same as the training architecture 500 of FIG. 5, with inference architecture 600 lacking the loss function 560 and ground-truth segmentation masks 545 used to perform training. In other words, the inference and training processes associated with the presently disclosed segmentation machine learning networks can be the same or similar to one another.

In one illustrative example, the image segmentation model 620 included in the inference architecture 600 can be a trained image segmentation model (e.g., the same as or similar to the image segmentation model 520 that is trained according to the process of FIG. 5, described above). The inference input(s) 602, 604, 606 to the trained image segmentation model 620 can be the same as or similar to the training inputs 502, 504, 506 provided to the image segmentation model 520 during training. For example, the inference inputs (e.g., collectively, inference inputs 610) can be obtained from an ALB system and can comprise rasterized but un-labeled ALB waveform data. In other words, the inference inputs 610 and the training inputs 510 can be the same or similar, with the training inputs 510 including annotations and the inference inputs 610 lacking any annotations or labeling.

In some embodiments, the inference inputs 610 can be provided to an image inference transformation engine 615. The image inference transformation engine 615 can apply one or more image transformation and/or image augmentation operations. For instance, image inference transformation engine 615 can apply one or more transformation or augmentation operations that are the same as or similar to a respective transformation or augmentation operation applied by image training engine 515 during training (e.g., as described above with respect to FIG. 5). In one illustrative example, image inference transformation engine 615 can apply a min-max transformation without applying further transformation or augmentation operations. In some aspects, the min-max transformation can be performed by image inference transformation engine 615 as: val_transform=A.Compose([A.ToFloat (max_value=65535.0), ToTensorV2( )]), although various other implementations of a min-max transformation may also be utilized without departing from the scope of the present disclosure.

In some examples, the trained image segmentation model 620 can be implemented using one or more CPUs and/or GPUs. In some embodiments, the trained image segmentation model 620 can be combined with an ALB waveform collection or acquisition system, such that ALB waveform data can be collected by the ALB system and processed by the associated trained image segmentation model 620. For instance, as contemplated herein, the trained image segmentation model 620 can be used to generate the output segmentation masks 630 in substantially real-time. In other examples, the trained image segmentation model 620 can be used to perform offline processing of collected ALB waveform data. Advantageously, however, the real-time (or substantially real-time) processing of ALB waveform data to generate the output segmentation masks 630 can be used to guide the associated ALB waveform data collection process. For example, if ALB waveform data is being collected in adverse weather conditions (e.g., foggy, cloudy, etc.) and/or water conditions (e.g., murky, highly turbid, etc.), real-time output segmentation masks 630 generated by the trained image segmentation model 620 in substantially real-time can be used to make decisions on whether to continue the ALB waveform data acquisition run (e.g., based on the real-time output segmentation masks 630 having an acceptable quality despite the current collection conditions) or to terminate the ALB waveform data acquisition run (e.g., based on the real-time output segmentation masks 630 being compromised or of an unusable quality due to the current collection conditions).

Figure 7:
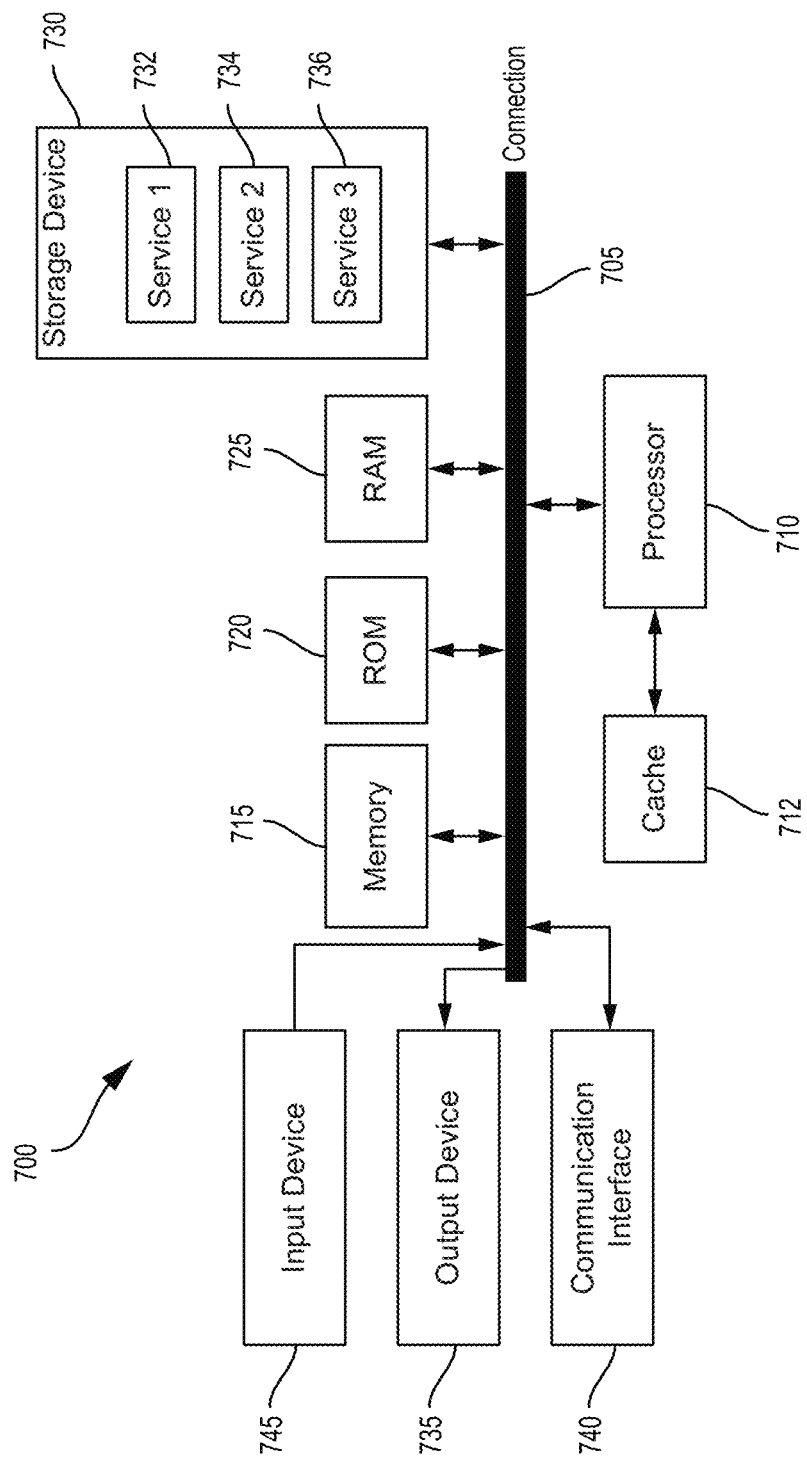
FIG. 7 is a block diagram illustrating an example of a computing system for implementing certain aspects described herein.

FIG. 7 illustrates a computing system architecture, according to some embodiments of the present disclosure. Components of computing system architecture 700 are in electrical communication with each other using a connection 705. Connection 705 can be a physical connection via a bus, or a direct connection into processor 710, such as in a chipset architecture. Connection 705 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read-only memory (ROM) 720 and random-access memory (RAM) 725 to processor 710. Computing system 700 can include a cache of high-speed memory 712 connected directly with, in close proximity to, or integrated as part of processor 710.

Processor 710 can include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. There is no restriction on operating on any hardware arrangement, and therefore the basic features here may easily be substituted for improved hardware or firmware arrangements as they are developed.

Storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A method comprising:
   obtaining a plurality of geospatial data inputs, each geospatial data input of the plurality of geospatial data inputs associated with a sample time and a surveyed area;
   generating a plurality of features corresponding to each geospatial data input of the plurality of geospatial data inputs; and
   generating, using a segmentation machine learning network, one or more segmentation masks for the plurality of geospatial data inputs,
   wherein the segmentation machine learning network includes a segmentation decoder network trained on a plurality of training data inputs, each training data input comprising multiple annotated and rasterized bathymetry frames.

2. The method of claim 1, wherein:
   the plurality of geospatial data inputs includes a current frame of bathymetry data; and
   the one or more segmentation masks are generated for the current frame of bathymetry data.

3. The method of claim 2, wherein each segmentation mask of the one or more segmentation masks is indicative of a particular feature detected in the current frame of bathymetry data, wherein each segmentation mask is indicative of a different particular feature.

4. The method of claim 3, wherein the one or more segmentation masks include:
   a first segmentation mask indicative of a water surface feature detected in the current frame of bathymetry data; and
   a second segmentation mask indicative of a seabed feature detected in the current frame of bathymetry data.

5. The method of claim 4, wherein the one or more segmentation masks further include a third segmentation mask indicative of a topographic feature detected in the current frame of bathymetry data.

6. The method of claim 1, wherein each geospatial data input is associated with a different sample time and a different surveyed area, wherein the different surveyed areas are at least partially overlapping between each consecutive pair of geospatial data inputs of the plurality of geospatial data inputs.

7. The method of claim 1, wherein the geospatial data input includes:
   a first frame of bathymetry data associated with a current sample time;
   a second frame of bathymetry data associated with a previous sample time, the previous sample time before the current sample time; and
   a third frame of bathymetry data associated with a subsequent sample time, the subsequent sample time after the current sample time.

8. The method of claim 1, wherein each training data input is annotated with one or more ground-truth segmentation masks, the one or more ground-truth segmentation masks and the generated one or more segmentation masks associated with a same set of feature classifications.

9. The method of claim 1, wherein the segmentation machine learning network comprises a convolutional neural network (CNN).

10. The method of claim 1, wherein the plurality of geospatial data inputs comprises a plurality of light detection and ranging (LIDAR) bathymetry frames.

11. The method of claim 10, wherein each respective LIDAR bathymetry frame of the plurality of LIDAR bathymetry frames comprises a rasterized frame of LIDAR bathymetry waveforms.

12. The method of claim 11, wherein the LIDAR bathymetry waveforms are obtained using an airborne laser bathymetry (ALB) system.

13. A system comprising:
at least one processor; and
a memory storing instructions which when executed by the at least one processor, causes the at least one processor to:
  obtain a plurality of geospatial data inputs, each geospatial data input of the plurality of geospatial data inputs associated with a sample time and a surveyed area;
  generate a plurality of features corresponding to each geospatial data input of the plurality of geospatial data inputs; and
  generate, using a segmentation machine learning network, one or more segmentation masks for the plurality of geospatial data inputs,
  wherein the segmentation machine learning network includes a segmentation decoder network trained on a plurality of training data inputs, each training data input comprising multiple annotated and rasterized bathymetry frames.

14. The system of claim 13, wherein:
the plurality of geospatial data inputs includes a current frame of bathymetry data; and
the one or more segmentation masks are generated for the current frame of bathymetry data.

15. The system of claim 14, wherein each segmentation mask of the one or more segmentation masks is indicative of a particular feature detected in the current frame of bathymetry data, wherein each segmentation mask is indicative of a different particular feature.

16. The system of claim 15, wherein the one or more segmentation masks include:
  a first segmentation mask indicative of a water surface feature detected in the current frame of bathymetry data; and
  a second segmentation mask indicative of a seabed feature detected in the current frame of bathymetry data.

17. The system of claim 16, wherein the one or more segmentation masks further include a third segmentation mask indicative of a topographic feature detected in the current frame of bathymetry data.

18. They system of claim 13, wherein each geospatial data input is associated with a different sample time and a different surveyed area, wherein the different surveyed areas are at least partially overlapping between each consecutive pair of geospatial data inputs of the plurality of geospatial data inputs.

19. The system of claim 13, wherein the geospatial data input includes:
  a first frame of bathymetry data associated with a current sample time;
  a second frame of bathymetry data associated with a previous sample time, the previous sample time before the current sample time; and
  a third frame of bathymetry data associated with a subsequent sample time, the subsequent sample time after the current sample time.

20. The system of claim 13, wherein each training data input is annotated with one or more ground-truth segmentation masks, the one or more ground-truth segmentation masks and the generated one or more segmentation masks associated with a same set of feature classifications.

* * * * *